United States Patent Office.

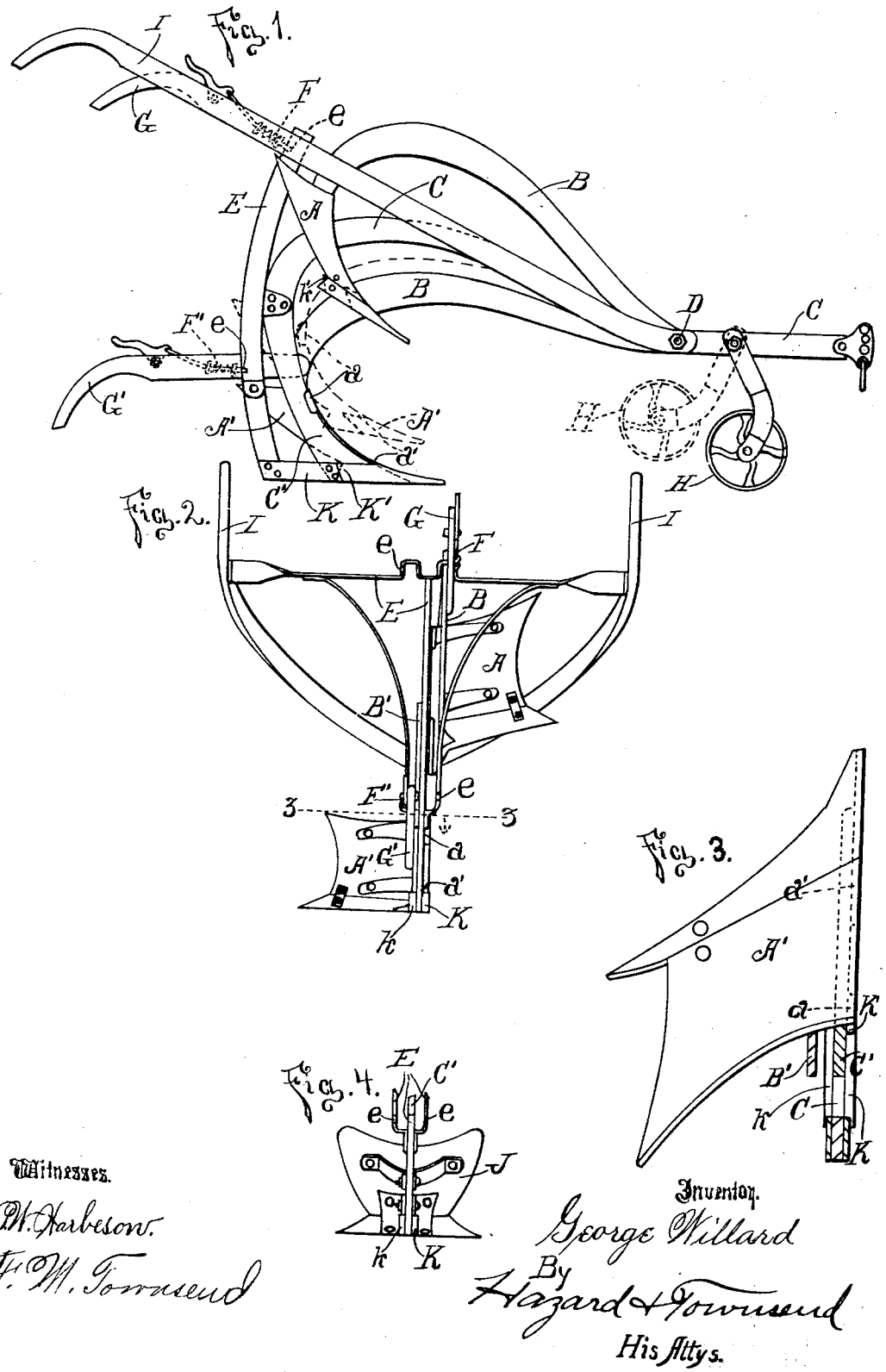

GEORGE WILLARD, OF LOS ANGELES, CALIFORNIA.

SIDE-HILL PLOW.

SPECIFICATION forming part of Letters Patent No. 520,281, dated May 22, 1894.

Application filed January 3, 1894. Serial No. 495,480. (No model.)

*To all whom it may concern:*

Be it known that I, GEORGE WILLARD, a citizen of the United States, residing at Los Angeles, in the county of Los Angeles and State of California, have invented a new and useful Improvement in Side-Hill Plows, of which the following is a specification.

The object of my invention is to provide a side-hill plow of superior convenience of operation and simplicity of construction.

My invention comprises the features of construction and the combination of parts hereinafter fully set forth and claimed.

Figure 1 is a side elevation of my improved plow as it appears when upon the surface of the soil, ready to be placed into operation. Dotted lines indicate the position of one of the plowshares raised to remove it from the soil and also indicates the position the supporting wheel assumes when the plow is in operation. Fig. 2 is a rear elevation of the same. Fig. 3 is a sectional view on line 3—3 Fig. 2 looking down. Fig. 4 is a rear elevation of the lower portion of my plow adapted for ditching purposes.

The principal feature of my invention comprises the combination of a right hand plow and a left hand plow A and A' arranged with their points in the same direction, and having their beams B and B' respectively pivotally attached to each other to allow such plows to be alternately and independently elevated and lowered with relation to each other and thus to allow either plow to be forced into the soil or to be removed therefrom as may be desired, and suitable means arranged to secure the plows in their various positions.

In order to give a construction which will be sufficiently rigid to withstand heavy work, and at the same time provide a suitable base for sustaining the frame which is arranged to guide the plows in their movement while being raised and lowered, and to sustain the plows in their elevated position or in their lowered position, I provide a main or draft beam C which has its rear and lower end C' arranged to extend into the furrow cut by the plow when the plow is in operation, and I provide each of the right and left hand plows with a socket $a$ and $a'$ respectively, adapted and arranged to seat upon and embrace the lower end of such main beam when its respective plow is in its lowered position.

The main draft beam C is made of iron and is curved at its rear end as shown in Fig. 1 and the beams B and B' of the right and left hand plows A and A' respectively are also curved.

In being raised or lowered in the act of being removed from or forced into the soil the plows A and A' describe the arc of a circle of which their pivotal point D is the center; the lower end C' of the main beam C is curved toward the front to cause such lower end of the main beam to intercept the plows when they are forced into the soil as shown in Fig. 1, and the body of the main beam above such lower end is curved to the rear of the path described by the plows while being raised and lowered, to thereby allow the plows to be carried slightly to the right or to the left of the main beam when the plows are partially raised and the sockets $a$ ($a'$) are released from the bottom of the beam; thus to permit the two plows to pass each other. That is to say, the sockets $a$ and $a'$ each rest upon and embrace the lower end C' of the main beam when their respective plow is in its lowered position, and in order to allow the other plow to be placed in position with its sockets arranged to embrace such lower end of the beam it is necessary that the sockets of such other plow shall be moved to its side of the main beam in order to allow the other plow to be lowered without engaging with the sockets of the plow which has previously been elevated.

E represents the plow and handle guiding and sustaining frame which is arranged at the rear of the main plow beam C and is provided with suitable ratchet teeth $e$ adapted to receive the pawls of the ratchets F and F' which are respectively secured to the operating handles G and G' which are secured to their respective plows A and A' and are arranged in the guide and sustaining frame E.

H is a supporting wheel pivotally secured to the main beam C and when the end of a furrow is reached, the operator tilts down upon the handles of the plow, and front end of the beam is thereby raised and the wheel swings down into the position shown in solid lines in Fig. 1 and forms a fulcrum to assist in turning the plow.

In practice one plow is lowered into position to turn the soil in the direction required, and in Figs. 1, 2 and 3 the left hand plow is shown thus arranged. When the end of a furrow is reached the plow which has just been in use in turning such furrow is elevated into the position shown by the plow A in Figs. 1 and 2 and is secured in its elevated position by the ratchets F or F'; then the other plow is lowered to cause it to be forced into the soil and the returning furrow is plowed, throwing the soil into the furrow previously opened by the reverse plow.

The handles G and G' respectively furnish a convenient means in connection with the main handles I for guiding the plow and enable the plowman to walk upon the unstirred soil instead of in the furrow as is ordinarily necessary.

When it is desired to use the plow as a ditching plow, the plows A A', with their beams B B' are removed from the main beam C, and the double plow J is secured upon the lower end of the beam as shown in Fig. 4, and the plow is thus adapted for convenient use in making irrigating and other ditches.

K K' and k k' indicate the land sides. The rear side K upon one side of the frame E and beam C is curved at its front end in the arc of a circle of which the beam pivot D is the center; and the land side K' of the plow A' is curved at its rear end to fit the curved land side K so that when the plow is lowered its land side K' will fit the land side K and together therewith form a continuous land side. The construction with relation to the land side K K' on the other side of the beam and frame is the same as that just described. The land side on one side of the beam and frame is thus formed by a fixed rear section which is attached to the beam and frame and the movable front section attached to and moving with the movable plow which is upon the opposite side of such beam and frame and the land side attached to the movable plow fits over the front of the lower end of the beam and serves to clamp the plow to such beam.

Either or both of the plows can be removed by removing the pivot D and both are to be removed when it is desired to apply the ditcher to the main beam C.

Now, having described my invention, what I claim as new, and desire to secure by Letters Patent, is—

1. In a plow the combination of a main beam having its rear and lower end arranged to extend into the furrow cut by the plow: the right hand plow and the left hand plow each provided with a forwardly extending beam pivotally secured to the main beam, and also provided with a socket adapted to embrace and seat upon the lower end of the main beam when its respective plow is in its lowered position: the handle and plow guiding and sustaining frame arranged at the rear of the main beam and provided with the ratchet teeth: and the plow operating handles, one being fixed to the right hand plow and the other to the left hand plow, and each being arranged in the guide frame and provided with the ratchet arranged to engage such frame to lock each of such plows in its elevated and in its lowered position.

2. In a plow, the combination of the main beam having its rear and lower end arranged to extend into the furrow cut by the plow: the right hand plow and the left hand plow, each having its beam pivoted to the main beam, and each arranged to describe the arc of a circle while being elevated and lowered, such main beam having its lower end arranged to intercept the plows when they are respectively forced into the soil, and having its body above such lower end curved to the rear cut of the path of the plows while being elevated and lowered, and suitable means for sustaining the plows in their various positions.

GEORGE WILLARD.

Witnesses:
JAMES R. TOWNSEND,
ALFRED I. TOWNSEND.